Figure 10:
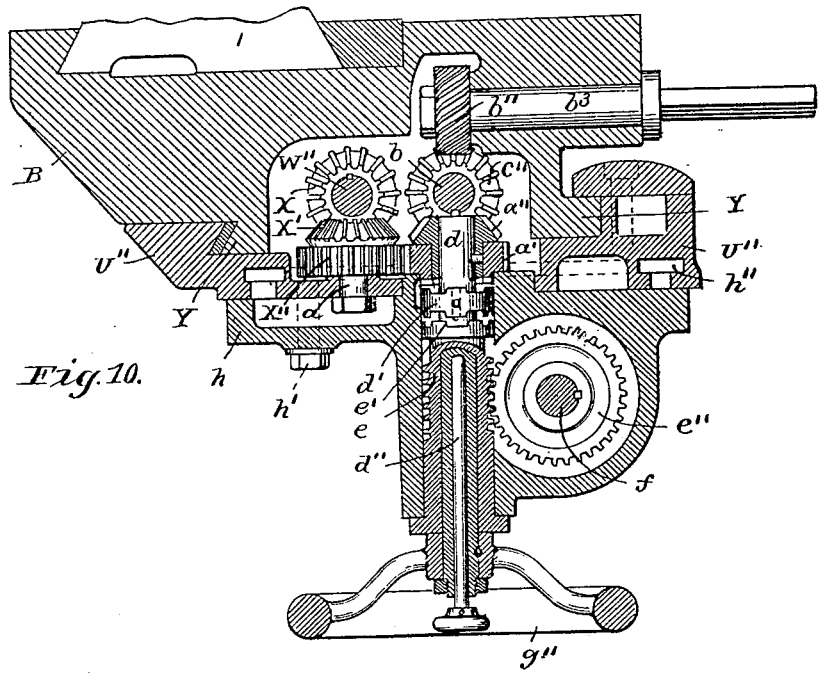

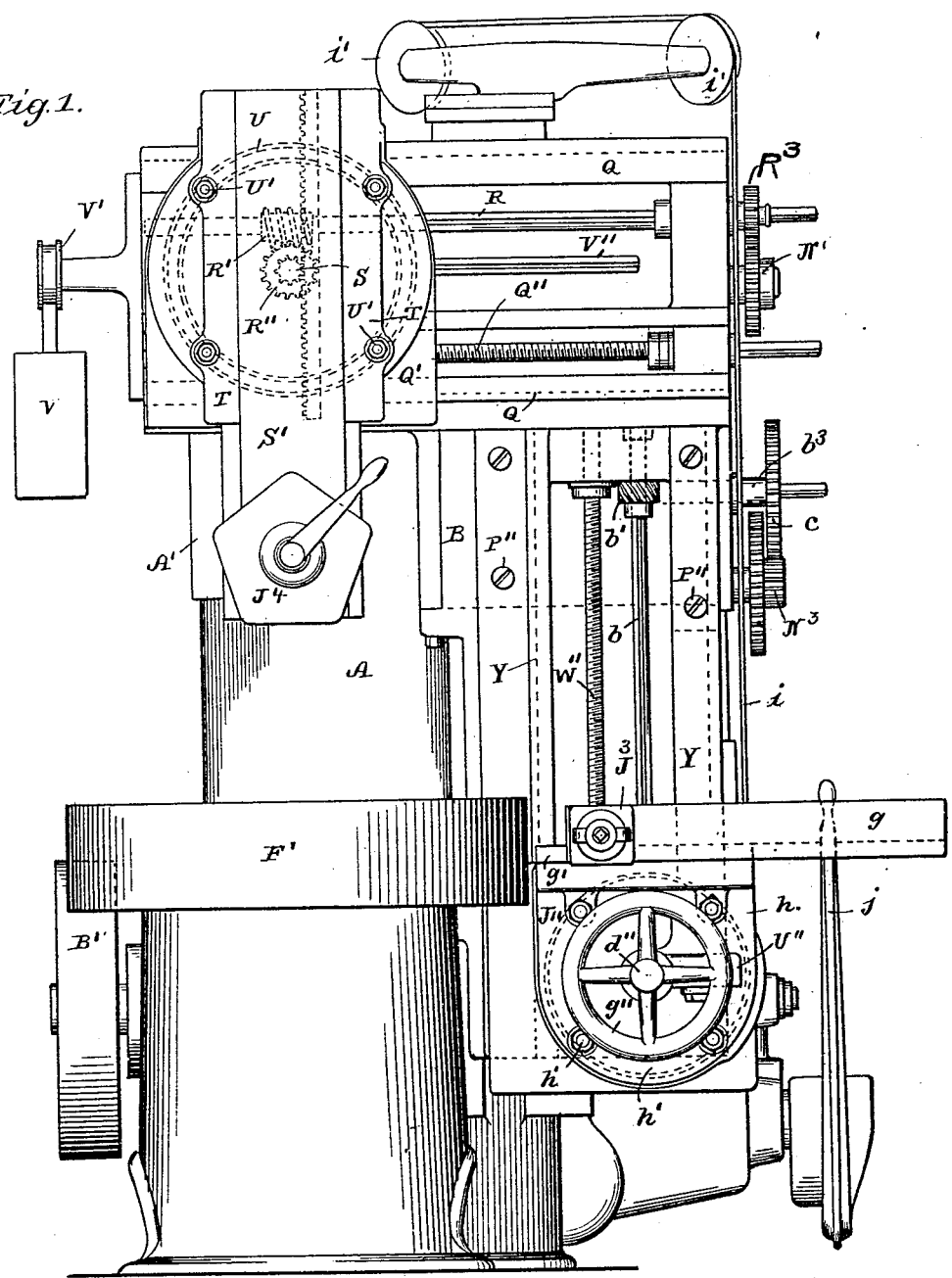

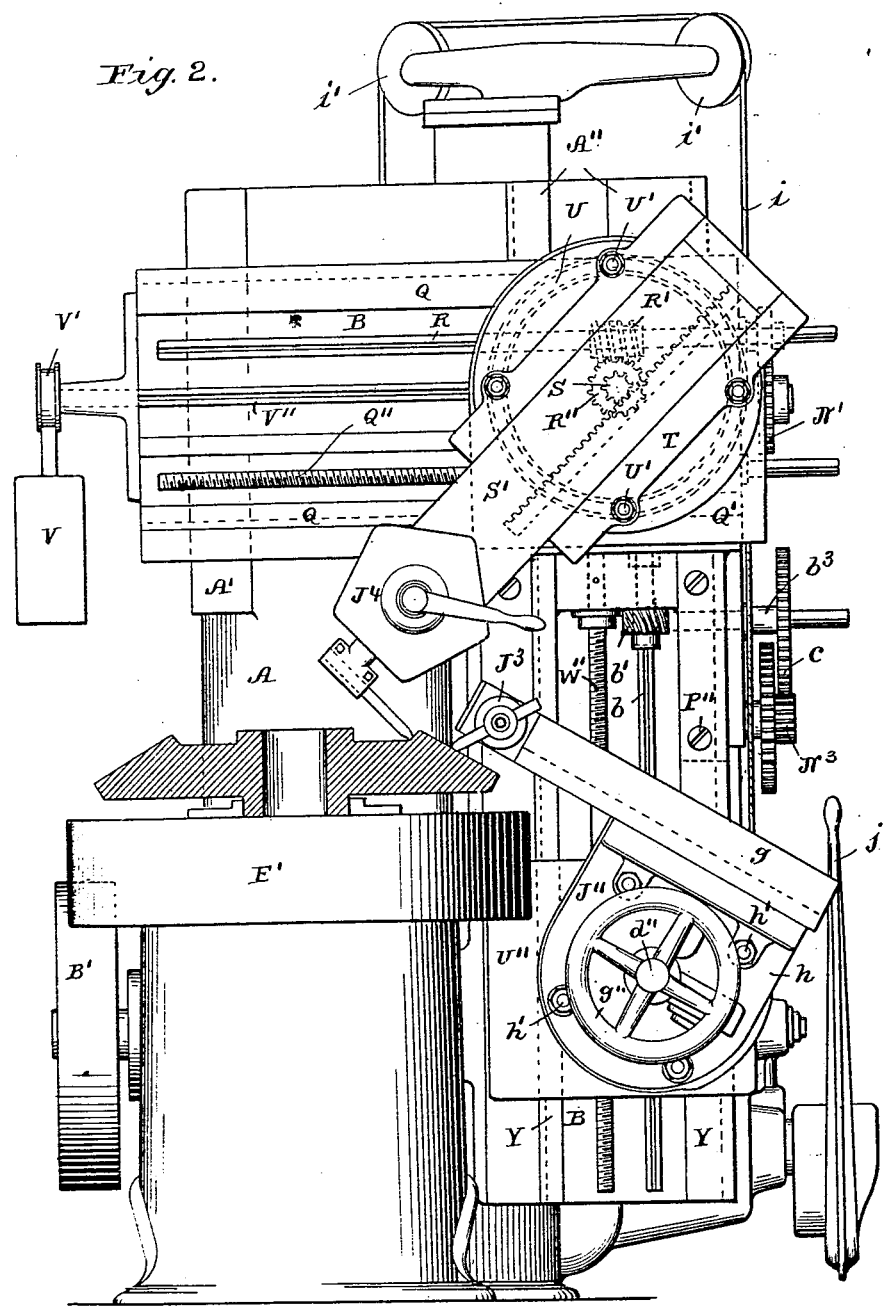

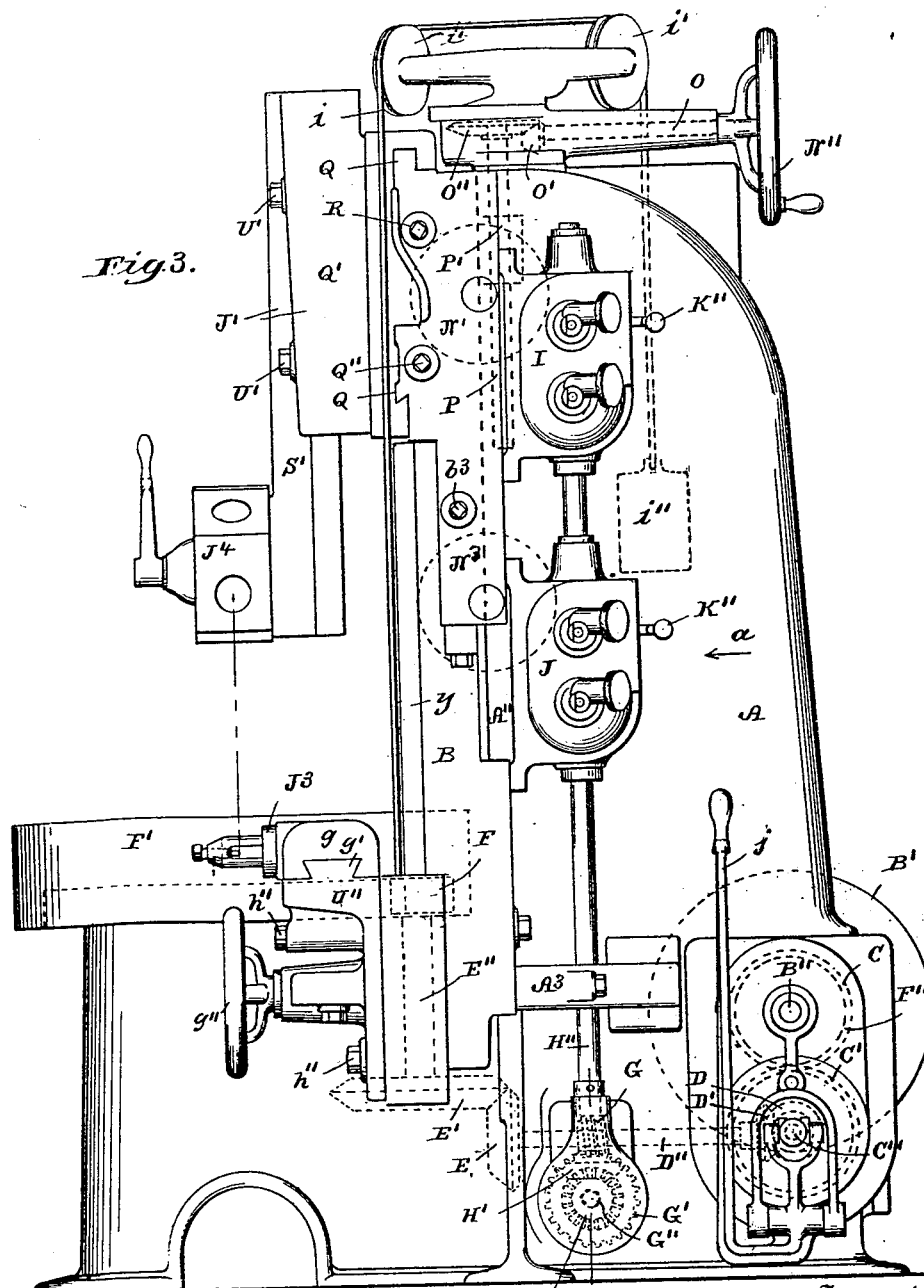

No. 877,402. PATENTED JAN. 21, 1908.
E. P. BULLARD, Jr.
VERTICAL TURRET LATHE.
APPLICATION FILED APR. 23, 1904.
7 SHEETS—SHEET 4.
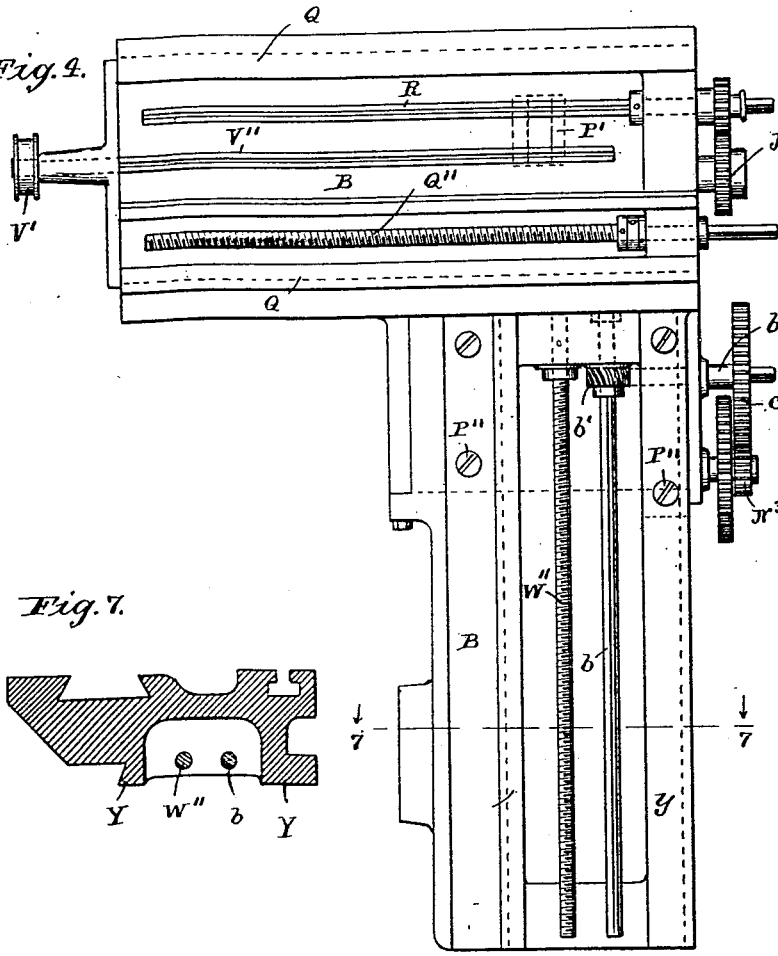
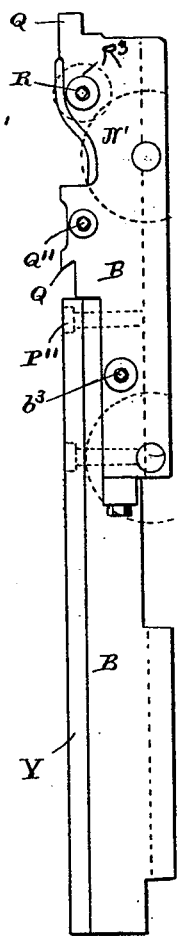
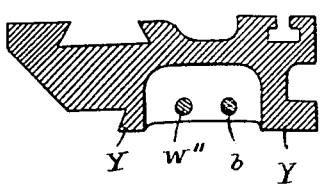
Witnesses
Phillip V. Devitt
Sam P. Senior
Inventor
Edward P. Bullard Jr.
By Chamberlain & Newman
Attorneys No. 877,402. PATENTED JAN. 21, 1908.
E. P. BULLARD, Jr.
VERTICAL TURRET LATHE.
APPLICATION FILED APR. 23, 1904.
7 SHEETS—SHEET 5.
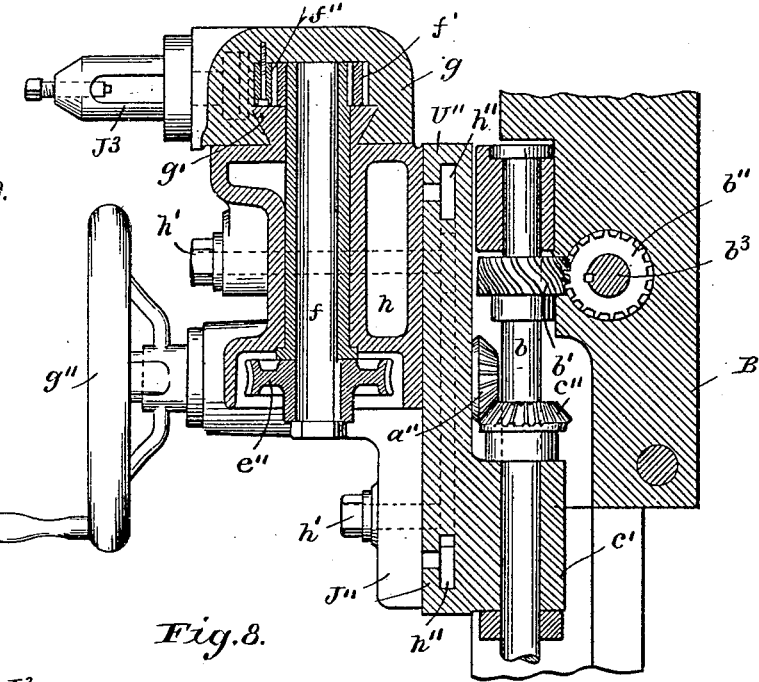
Fig. 9.
Fig. 8.
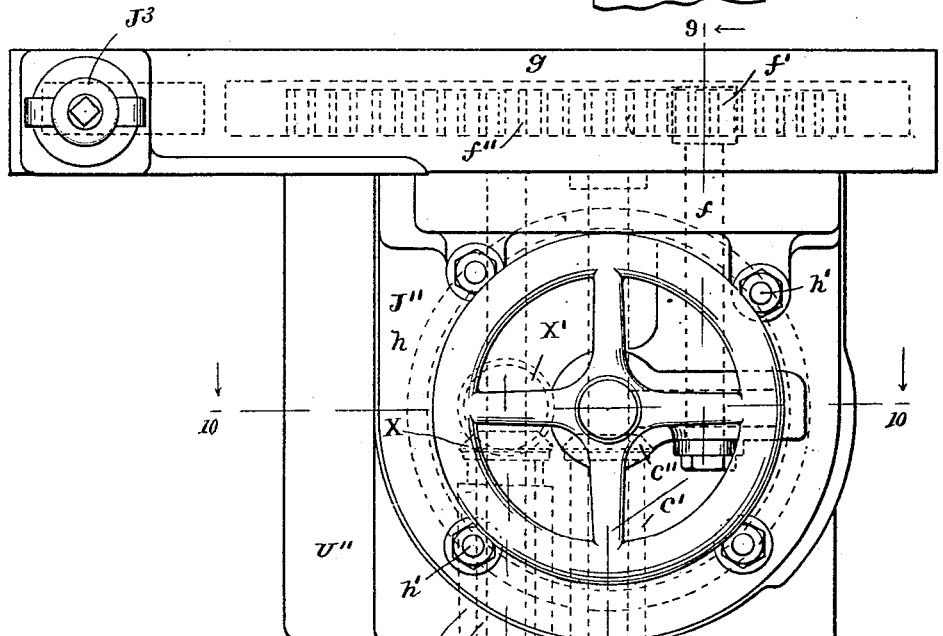
Witnesses
William P. DeVitt
Sam P. Senior
Inventor
Edward P. Bullard Jr.
By Chamberlain & Newman
Attorneys No. 877,402. PATENTED JAN. 21, 1908.
E. P. BULLARD, Jr.
VERTICAL TURRET LATHE.
APPLICATION FILED APR. 23, 1904.

7 SHEETS—SHEET 6.

Witnesses
William R. DeWitt
Sam P. Senior

Inventor
Edward P. Bullard Jr.
By Chamberlain + Newman
Attorneys

No. 877,402.

PATENTED JAN. 21, 1908.

E. P. BULLARD, Jr.
VERTICAL TURRET LATHE.
APPLICATION FILED APR. 23, 1904.

7 SHEETS—SHEET 7.

Witnesses
William R. Devitt
Sam P. Senior

Inventor
Edward P. Bullard Jr.
By Chamberlain & Newman
Attorneys

UNITED STATES PATENT OFFICE.

EDWARD P. BULLARD, JR., OF BRIDGEPORT, CONNECTICUT, ASSIGNOR TO THE BULLARD MACHINE TOOL COMPANY, OF BRIDGEPORT, CONNECTICUT, A CORPORATION OF CONNECTICUT.

VERTICAL TURRET-LATHE.

No. 877,402.   Specification of Letters Patent.   Patented Jan. 21, 1908.

Application filed April 23, 1904. Serial No. 204,593.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Vertical Turret-Lathes, of which the following is a specification.

My invention relates to improvements in vertical turret lathes having both a crosshead and a side-head, and comprises such a novel construction and arrangement of the heads and their supports that a machine embodying it will have a greater range of cut, perform a larger variety of operations, and be more readily adjusted to the work than any machine of this type at present known to me.

The main object of my invention is to construct a compact machine which will not only include within the scope of its operations all those now performed by boring mills, turret lathes, and engine lathes, but one on which the work can be handled more advantageously and the various operations performed more conveniently and expeditiously than on those machines. To a limited extent this object has been attained by machines now in use, among which may be mentioned the vertical turret lathe described in Letters Patent of the United States No. 683,592, issued to me Oct. 1, 1901. In the latter machine the cross-head and side-head are mounted upon stationary guide-ways placed in different planes and the tool of each head is adapted to be fed crosswise or lengthwise of the axis of rotation of the table. The utility of machines of that general design, however, is limited in that the tool of neither head can be fed at an oblique angle to the table, a requirement demanded by a large class of work; the cutting capacity of the side tool is also limited in that the side-head, in its upward travel, strikes the cross guide-ways before its tool has reached a height from the table corresponding to that of the underside of the guide-ways, which ways should, in a compactly designed machine, determine the range of vertical cut; and the efficiency of such machines, from the standpoint of quick adjustability of the cutting tools of each head to the work, is restricted in that the heads are adjusted lengthwise of the work independently instead of conjointly and independently.

Included in the main object of my invention, therefore, are the following specific objects, the fulfilment of which wholly eliminates the restrictions and limitations above mentioned, to wit:—to so design the two heads of the machine that the cutting tool of each will have a transverse and longitudinal movement the full axial and radial swing of the rotary table, and to so combine them that their respective cutting tools may be brought into close contact with each other anywhere within their sphere of operation, and in that position fed conjointly crosswise or lengthwise of the axis of rotation of the work, whereby the two tools for instance may be conjointly used on a crosswise or lengthwise roughing cut, thus accomplishing by their joint use twice as much as could be accomplished by either tool alone; to so design each head that its cutting tool may be fed at any desired angle to the table, and to so support them that they may be either conjointly or independently adjusted lengthwise of the axis of rotation of the work supported upon the rotary table; to so design the machine that the side-head and its feed mechanism will be entirely independent of the cross-head and its feed mechanism, and thereby capable of being added to the machine at any future date, thus providing a machine that can be constructed and sold either as a cross and side-head machine completed, or as a cross-head machine alone, with the option in the purchaser of the single head machine of purchasing the side-head and adding it to the machine at a later date if his special requirements demand it; and finally to so design the machine that it may be built and placed on the market at a comparatively low figure.

In illustrating my invention I have purposely omitted certain details that are common to all machines of this class and have but partially outlined certain features which are reserved for separate applications.

Figure 12:
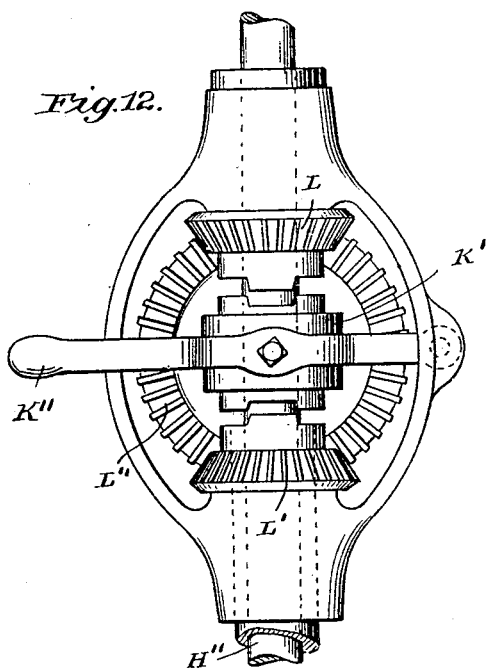
Figure 11:
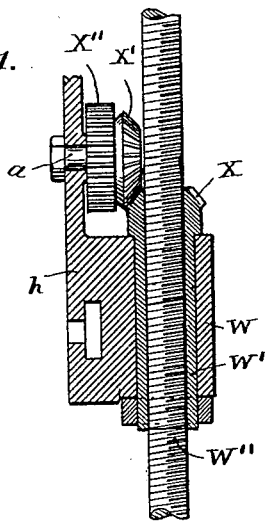
Figure 13:
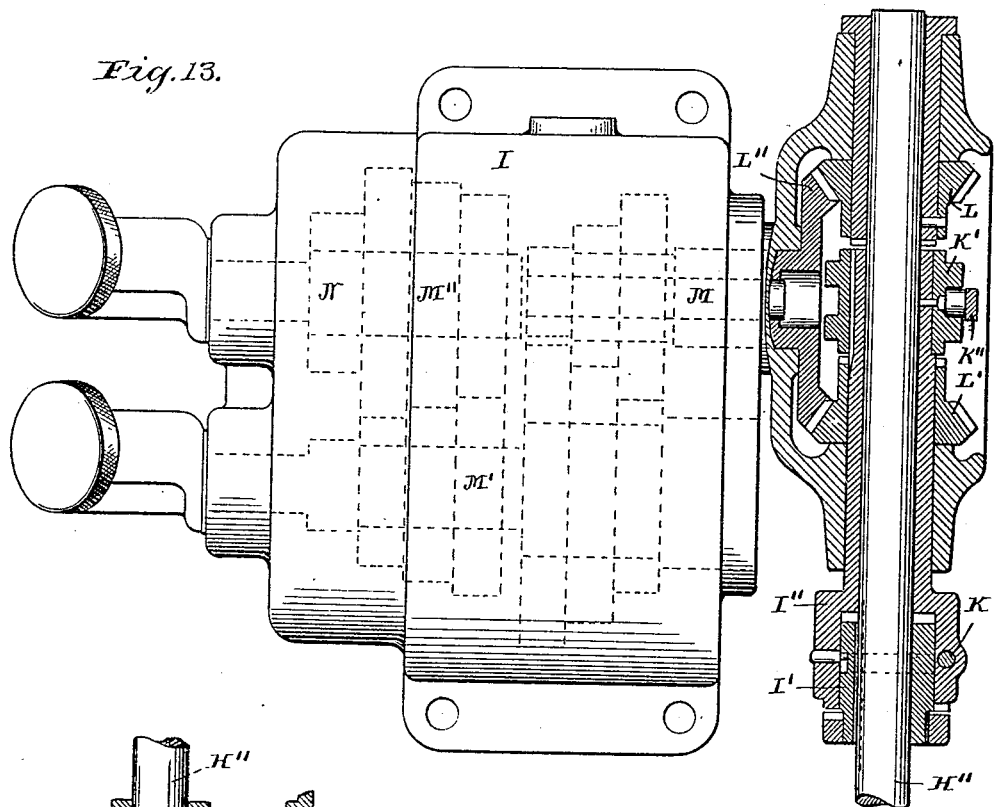
Figure 14:
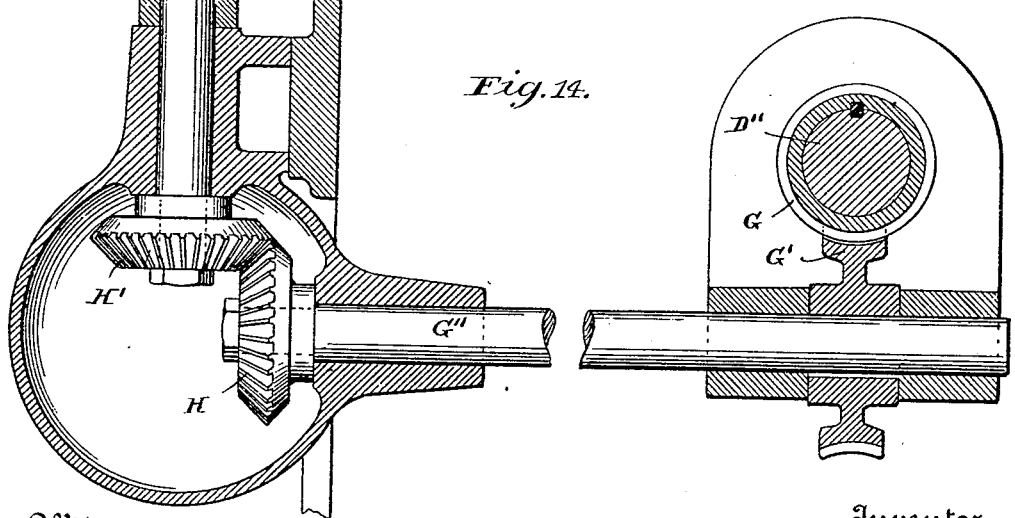

With the above and other minor objects in view my invention resides and consists in the novel construction and combination of parts shown upon the accompanying seven sheets of drawings which form a part of this specification, and upon which similar characters of reference denote like or corresponding parts throughout the several figures, and of which Figure 1 shows a front elevation of my machine complete, both the cross and side-heads being shown in a position of rest. Fig. 2 is also a front elevation, but shows the heads shifted into operative position for cutting a gear blank carried by the rotary work-holder. Fig. 3 is a side elevation of the machine. Fig. 4 is a front elevation of the adjustable double rail seen in the preceding views and upon which both the cross and side-heads are adjustably mounted. Fig. 5 is a side view of the double rail, but with the gears shown in dotted outline; and Fig. 6 a plan view of the same. Fig. 7 is a detail cross section view of said rail taken on line 7—7 of Fig. 4. Fig. 8 is an enlarged front elevation of the side-head seen in Figs. 1, 2, and 3. Fig. 9 is a vertical cross section through said side-head taken on line 9—9 of Fig. 8. Fig. 10 is a horizontal cross section taken on line 10—10 of Fig. 8, and illustrates the shiftable clutch mechanism for actuating the side-head laterally, or its tool slide crosswise at whatever angle it may be adjusted. Fig. 11 is a detail vertical section taken on line 11 of Fig. 8. Fig. 12 is a detail side view as seen from the right of F Fig. 13, and illustrates the clutch mechanism. Fig. 13 is an enlarged rear elevation (see arrow $a$ Fig. 3) of one of the changeable speed mechanisms inclosed, by means of which the cross-head and side-head, and their respective tool-slides, are operated; and also shows in vertical section the reversing device for said speed-changing mechanism. Fig. 14 is an enlarged detail sectional elevation of certain gears and shafts employed in driving the speed device and heads above mentioned, the section being indicated by line 14 of Fig. 3.

An examination of Figs. 1, 2, and 3 plainly shows that the main elements of my machine comprise a frame A, a rotary table or work-holder F' supported by the frame, a tool carrying cross-head and side-head carried upon the transverse and lateral arms respectively of a right angled cross-rail B mounted upon guide-ways A' A'' and guide-bracket $A^3$ of the frame, and mechanism for operating the table and heads. The construction of each and the manner in which they are combined to attain the objects above set forth I will describe in detail.

The cross-head comprises a saddle Q' having ways on its rear face adapted to fit the transverse guide-ways Q and an annular ⊥ shaped recess U on its front face, a guide-plate T swiveled on the saddle, a tool-slide S' mounted in guide-ways of the swiveled plate, and a rotatable turret tool-head $J^4$ mounted upon the slide and adapted to carry the cutting tools. The swivel guide-plate T is securely clamped to the saddle by means of four ⊥ shaped bolts and binding nuts U', the shouldered ends of which are inserted in the annular recess U of the saddle and the shank ends of which project through the plate T. By loosening the nuts the plate, and consequently the tool-slide S' carried thereon, may be adjusted to any desired angle and then re-clamped in its new position by retightening the binding nuts. The cross-head is actuated along the transverse guide-ways Q by means of a feed-screw Q'' journaled in the cross-rail B, the screw end of which passes through a nut attached to the rear of the saddle Q' and the other end of which projects outside the rail and is adapted to receive either a pull-gear $R^3$ or a crank handle. The cross-head tool-slide S' is actuated by means of mechanism comprising a splined feed-rod R journaled in the cross-rail, one end of which passes through a worm R' carried by the saddle Q' and the other end of which projects beyond the rail and is also adapted to receive either said pull-gear $R^3$ or said crank handle; a worm-gear R'' meshing with the worm, and a pinion S meshing with a rack attached to the tool-slide S'. At the end of the rail is an intermediate gear N' which is revolved by means of a speed-changing mechanism to be hereafter described, and the placing of pull-gear $R^3$ on the feed-rod R or feed-screw Q'', on either of which it meshes with the intermediate gear N', determines, when the gear N' is revolving, whether the cross-head or the cross-head slide shall be operated. Either of them may also be operated by hand by means of a crank slipped onto the projecting ends of the feed-rod or feed-screw. It is thus apparent that the cross-head may be actuated either to the right or left on the transverse guide-ways Q and that its tool-slide may be actuated perpendicularly towards or away from the table or at any angle thereto, either by power or hand.

For the purpose of relieving the slide S' of its dead weight and thus render easy its movement in the guide-way of the plate T it is counterbalanced by means of a weight V suspended by a strap attached to the pulley V' of the shaft V''. This shaft is journaled in a bracket attached to the cross-rail and is operatively connected by suitable gearing (not shown) to the slide and the weight of the latter thereby neutralized. The method of combining these parts being one which I shall cover by a separate application I deem it proper to omit the details of construction in this application, and merely describe it in a general way as above set forth.

The side-head which is shown in detail in Figs. 8, 9, and 10 comprises the same elements as the cross-head, namely; a saddle U'' having guide-ways on its rear face registering with vertical guide-ways Y and an annular ⊥ shaped recess on its front face, a swivel guide-plate $h$ mounted on the saddle and provided with guide-ways $g'$ on a right angled extension, a tool-slide $g$ mounted on the guide-ways $g'$ and a tool-head $J^3$ mounted on the front face of the tool-slide. The swivel guide-plate is clamped to the saddle by means of ⊥ bolts and nuts $h''$ in the same manner as the cross-head saddle and its plate are clamped, and it may be clamped at any desired angle thereto, thus permitting the tool-slide to be fed parallel to the face of the rotary work-holder $F'$ or at any desired angle to said face.

The side-head is actuated along the vertical ways Y (Fig. 1) and its tool slide $g$ upon the angle plate guide-ways $g'$ by means of the following described mechanism:—$W''$ is a stationary screw attached to the vertical section of the right-angled cross-rail B, and $b$ is a splined rod journaled in said section and operatively connected to a driving rod $b^3$ by means of spiral gears $b'$ and $b''$ (Figs. 9, 10, 11). The outer end of $b^3$ is adapted to receive a pull-gear $c$, which meshes with an intermediate two-step gear $N^3$ driven by a train of gears hereafter described, or a hand-crank, whereby the rod may be revolved by power or by hand. The splined rod $b$ is operatively connected to the horizontal rod $d$ by means of bevel gears $c''$, $a''$, the former being keyed to the rod $b$ but carried by the saddle $U''$, and the latter being fastened to rod $d$. Running loose upon the hub of gear $a''$ is a clutch spur-gear $a'$ which meshes with a spur-gear $X''$. The latter gear is driven fast upon the hub of a bevel gear $X'$ which revolves loose upon a stud $a$ (Fig. 11) and meshes with a bevel-gear X cut upon a nut $W'$ of the stationary screw $W''$. The latter gear is shouldered in a long bearing W of the saddle and its revolution causes the saddle to rise or fall on the vertical ways depending upon the direction in which it is revolved.

Upon the horizontal shaft $d$ (Fig. 10) is a clutch sleeve $e'$ having a thread $e$ cut upon its outer surface which meshes with a worm-gear $e''$. The latter is keyed to a vertical shaft $f$ (Fig. 9) and carries at its upper end a pinion $f''$ which meshes with a rack $f'''$ attached to the tool-slide $g$. Between clutch-gear $a'$ and clutch-sleeve $e'$ is a slidable clutch $d'$ which is keyed to the shaft $d$ and pinned to a knob-ended shift-rod $d''$ slidable within the shaft $d$ and by means of which it is shifted into driving contact with clutch-gear $a'$ or clutch-sleeve $e'$.

If the intermediate two step gear $N^3$ is revolving and the clutch $d'$ is thrown into contact with clutch-gear $a'$ the latter will set in motion the gears that operate the nut $W'$ upon the vertical screw $W''$ and cause the side-saddle and consequently the side-head to travel along the guide-ways of the vertical rail, and if the clutch is thrown into contact with the clutch-sleeve $e'$ the latter will revolve with bevel-gear $a''$ and set in motion the gears that operate the rack-pinion $f''$ and cause the tool-slide $g$ to travel along the ways of the swivel-plate and at whatever angle to the table it may be set. The direction of travel in each case will depend upon the direction in which the intermediate gear $N^3$ is revolving.

By drawing the pull-gear $c$ out of contact with gear $N^3$ and forcing the clutch $d'$ into contact with spur-gear $a'$ the side-head may be raised or lowered upon the side-rail by means of a hand-wheel $g''$ which is keyed to the rod $d$; by forcing the clutch into contact with clutch $e'$ of the threaded-sleeve $e$ the tool slide $g$ may be actuated either forward or backward.

The side-head is counterbalanced by means of an attached rope $i$ carried up over suitable pulleys $i'$ and supporting a weight $i''$, as shown, (Fig. 3).

In order to attain one of the objects of my invention, namely, a method of conjointly and independently adjusting the two heads lengthwise of the axis of rotation of the work, the guide-ways Q and Y upon which the heads travel are preferably placed upon a right-angled or ⌐ shaped cross-rail B which is adjustable upon the vertical guide-ways $A'$ $A''$ of the frame and guide bracket $A^3$. This rail is preferably made in two parts, for a reason to be hereafter explained, one part consisting of the transverse section which carries the transverse-ways Q and the other part consisting of the dependent section which carries the lateral-ways Y. They are preferably united by a lap and butt joint, as clearly shown in Fig. 5, the transverse section having a rabbeted extension on the lower side of its right hand end and the lateral section having its upper end rabbeted to fit said extension and the two being clamped together by screws $P''$.

The lateral-ways Y are beneath and preferably in the same plane with the transverse-ways Q, a sufficient space being left between them to permit the cross-head saddle $Q'$ to pass.

The conjoint adjustment of the heads and rail upon the frame is accomplished by the following means, to wit:—$N''$ is a hand wheel keyed to the outer end of a horizontal shaft O which is connected to a vertical screw P by means of miter-gears $O'$ $O''$. The latter passes through a nut $P'$ fastened upon the back of the transverse section of the cross-rail, and consequently a revolution of the hand wheel $N''$ will raise or lower the combined rail, and also the cross-head and side-head carried thereby, from or toward the rotary-table or work-holder $F'$. By combining the means thus offered for conjoint adjustment of the heads lengthwise of the axis of rotation of the table of the machine with the means for adjusting them separately upon their respective guide-ways the tool of each can be more readily adjusted to the work than if the heads were only adjustable separately.

The above mentioned arrangement of the transverse and lateral-ways in substantially the same plane, in combination with the design of the cross-head and side-head, in the latter of which the tool-slide is placed on top of a right-angled extension of the swivel-plate J″ (Figs. 3, 9) is one of the novel features of my invention and by means of it I attain some of the other objects set forth in the preamble. By bringing the lateral ways forward into substantially the same plane as the transverse ways and by offsetting the tool-slide g of the side-head, the slide, as its head is moved into its highest position with the saddle U″ in contact with the transverse section of the rail, will project over and clear the transverse ways and thus permit the cutting tool carried in tool-head J³ to have a lateral range of cut corresponding to the distance from the rotary table to the under side of the transverse section of the cross-rail, which distance I term the axial swing of the table. The tool-slide g is also adapted, as shown in Fig. 1, to radial adjustment crosswise of the table a distance exceeding the radial distance from the axis of the table to the lateral section of the cross-rail, which distance I term the radial swing of the table. The tool of the side-head is thus adapted to cut either the full radial swing of the table or the full axial swing. The cross-head tool also has the same range of cut by reason of the fact that the tool-slide S′ is adapted to vertical adjustment a distance that will permit a cutting tool of the turret-head J⁴ to travel from the rotary table to a height above the table corresponding to the height of the under side of the transverse section of the cross-rail, which section determines the axial swing of the table, and the saddle Q is adapted to transverse adjustment a distance that will permit said cutting tool to travel from the axial line of the table to a line further removed from the axis of the table than the inner edge of the lateral section of the cross-rail, which edge determines the radial swing of the table.

It is thus apparent that on certain crosswise cuts or cuts lengthwise of the axis of rotation of the table the cutting tool of either head may be used, and it is also apparent that they may be brought into close contact with each other and in that position fed conjointly crosswise or lengthwise of the axis of rotation of the table anywhere within the cutting space, which space is bounded on two sides by the axial line of the table and a line at the same distance therefrom as the inner edge of the lateral section of the cross-rail, and on the other two sides by the table itself and a line at the same distance therefrom as the lower edge of the transverse section of the cross-rail. This adaptability of the heads whereby the tool of either may be fed crosswise or lengthwise of the axis of rotation of the table the full axial or radial swing of the table, or at any desired angle thereto, or conjointly on the same or different crosswise cuts or cuts lengthwise of the axis of rotation of the table is novel and of special value in a large variety of work. By means of it the tools of the cross-head can perform not only all the operations required on the top of the work carried by the rotary table, and the tool of the side-head not only all the operations required on the side of the work, but, if necessary, both tools can also operate on either the top or the side of the work, thus securing advantages incident to machines having two cross-heads or two side-heads; or the cutting tool of each head may be brought close together, one having a slight lead over the other, and fed conjointly on combined roughing cuts crosswise or lengthwise of the axis of rotation of the table and thus accomplish by their joint use twice as much as could be accomplished by the use of one cutting tool alone.

The construction of the two heads and their arrangement upon the cross-rail having been described, a description of the driving mechanism by which the table or work-holder F′ and the heads are operated will now be given.

The main driving pulley B′ (Fig. 3) of the machine is situated on the left hand side and to the rear of the frame and keyed to a shaft B″. The latter supports a cone of speed gears C which meshes with a reverse cone of speed gears C′ running loose on shaft C″, anyone of which may be locked to said shaft by means of a clutch operated by a handle j. Shaft C″ is operatively connected to shaft D″ by means of miter-gears D D′ and the latter shaft to the perpendicular shaft E″ by a second set of miter-gears E E′. The shaft E′ carries a pinion F which meshes with an internal spur-gear carried by the rotary table. It is thus apparent that the operator, by locking a gear of train C′ to shaft C″ by handle j, may cause a revolution of the driving pulley B′ to be imparted to the rotary table F′ and the latter rotated on its vertical axis.

For the purpose of operating the two heads along their respective guide-ways and the tool slide of each at any angle to the table at which it may be set a train of mechanism is led off from shaft D″ (Figs. 3 and 4) by means of a worm G which is keyed to said shaft and which meshes with a worm-gear G′ keyed to a shaft G″. The latter is operatively connected to a vertical shaft H″ by means of miter-gears H H′. Between shaft H″ and the intermediate gears N′ N³ on the right hand side of the cross-rail, one of which N′ meshes with gear R³ slipped onto either rod R or feed-screw Q″ and the other of which N³ meshes with pull-gear c slipped onto rod b³ are two sets of reversing and change speed mechanism I and J, each inclosed in suitable casings. The two sets of mechanism are alike in construction and I will therefore use the same reference characters to designate duplicate parts and describe in detail but one. Referring therefore to Fig. 13 it will be seen that to the shaft H″ is keyed a collar I′ that is free to move up or down upon the shaft, and covering this collar is a sleeve I″ that is clamped to said collar by means of a screw K. To the upper end of this sleeve is keyed a movable clutch member K′, which is operated by a common form of lever K″ (Fig. 12) whereby said clutch member and sleeve, together with the collar I′ before mentioned, may be shifted up or down on the shaft and thrown into engagement with either the clutch face of the upper bevel-gear L or the lower bevel-gear L′. Both of these gears mesh with a large bevel-gear L″ and drive its shaft M, the direction of revolution obviously depending upon which of the bevel-gears is the driver.

The shaft M is connected with the shaft M′ by suitable gears of varying sizes, and this shaft in turn is likewise connected by varying-sized gears with the third shaft M″ that carries an extra gear N which meshes with and drives an intermediate gear N′ shown in dotted lines in Figs. 3 and 5 which latter transmits power to the feed shafts and screws. These gears upon the shafts M′ and M″ are each provided with clutch mechanisms whereby different ones may be put into engagement, thus changing the speed.

It is apparent from the foregoing description that if the vertical shaft H″ is in motion and pull-gears R³ is slipped onto the outer end of cross-screw Q″ and meshed with intermediate gear N′, and clutch K′ is thrown into driving contact with either of the clutch bevel-gears L or L′ by means of clutch-lever K″ the cross-head will travel to the right or left on the transverse guide-ways, the direction of movement depending upon which of the bevel gears is being driven by clutch K′; if pull-gear R³ is slipped onto the outer end of cross-rod R the cross-head saddle will remain stationary and its tool-slide will travel toward or away from the rotary-table, and at whatever angle thereto it may be set by means of the swivel guide plate T, the direction of movement depending, as in the former case, upon whether clutch gear K′ is locked with gear L or L′. On the other hand, if either the cross-head or its tool-slide S′ are traveling along their respective guideways either may be thrown out of action by simply shifting clutch K′ into an inoperative position midway between gears L and L′. As before stated, either the cross-head or its tool-slide may also be operated along their respective ways by means of a crank handle placed upon the outer end of screw-rod Q″ or feed-rod R respectively.

The side-head is operated independently of the cross-head by means of the reversing and change-speed mechanism J. If pull-gear c is slipped onto rod b³ and into mesh with intermediate gear N′ and clutch d′ is thrown into mesh with clutch-gear a′ by means of shift-rod d″ the side-head will travel up or down the vertical guide-way Y, the direction of movement depending upon whether clutch K′ is thrown into driving contact with clutch bevel-gear L or L′. If clutch d′ is thrown into mesh with clutch-sleeve e′ the tool slide g will travel toward or away from the rotary-table, and at whatever angle thereto it may be set by means of its swivel guide-plate h, the direction of motion depending, as in the former case, upon which of the two gears is being driven by the clutch K′. If the side-head is traveling upon the vertical ways or the tool slide g upon its way either may be thrown out of action by either throwing the clutch d′ into its normal position midway between the clutch-gears with which it operates or the clutch K′ into its normal position between the clutch-gears with which it operates. As before stated, either the side-head or its tool slide may be actuated by hand power through the medium of the hand wheel g″, the pull gear c first being unmeshed from intermediate gear N³ and the clutch d′ locked with clutch gear a′ or worm sleeve clutch e′.

Attention is called to the fact that the transverse section of the cross-rail, the cross-head thereon, and the reversing and change-speed mechanism I through which the head is operated form a combination of elements which is entirely independent of a second combination comprising the lateral section of the cross-rail, the side-head thereon, and the reversing and speed changing mechanism J through which the side-head is operated, save that the two rail sections are united together by screws P″. The advantages of this arrangement, which is one of the special features of my invention, lies in the opportunity thereby offered of equipping the machine originally with the cross-head alone and of adding the side-head at a later period, if needed. The requirements of many purchasers are such that a cross-head machine will amply meet them at the time of purchase, and yet those requirements, through an increase of business or a change in the character of work, may at a later date necessitate the employment of a cross and side-head machine. That increased requirement may be readily met in a machine constructed as herein described and at a comparatively slight increase of cost, as the side rail and head, and mechanism for operating the head, may be added at any time.

The method of using and operating the machine is as follows: The work is first attached to the rotary table or work-holder and the cross-head then adjusted to the proper height by raising the cross-rail upon the frame of the machine by means of hand wheel N''. In raising the cross-rail the side head has also been raised and if further adjustment is necessary it can be secured by means of the hand wheel $g''$ or a crank handle, not shown, attached to the rod $b^3$, the pull gear $c$ being first pulled out of mesh and the clutch $d'$ thrust, by means of shift rod $d''$, into driving contact with spur gear $a'$. The tools are then clamped in their respective tool-holders and the tool-slides adjusted to the proper angle of cut by means of the swivel plates on which they are mounted. Further adjustment of the cross-head or its tool-slide may be secured by means of said crank handle applied to feed-screw Q'' or feed-rod R, and further adjustment of the side-head or its tool-slide may be secured by hand-wheel $g''$ or said crank-handle applied to rod $b^3$, the clutch $d'$ being thrust into contact with gear $a'$ if the head is to be raised or lowered, and pulled forward into contact with clutch-sleeve $e'$ if the tool-slide is to be operated. The tools and slides having been brought into proper position, as for instance as shown in Fig. 2, the machine may be set in motion by manipulating the handle $j$ which will set in motion the rotary-table or work-holder F' and the vertical driving shaft H''. By means of the speed and clutch mechanism I and J the tools of each head may be driven independently in the direction and at the speed desired or the tool of either head may be operated alone.

Having thus described my invention, what I claim and desire to secure by Letters Patent is:—

1. The combination, with frame-work, of a work-supporting table; means for rotating said table; a horizontal guide-way; a vertical guide-way beneath and in substantially the same plane with the horizontal guide-way; a saddle adjustable upon each of said guide ways; a tool-slide carried by each saddle, each slide being arranged to project over and clear the guide-ways on which the saddle supporting the other slide is adjustable; a tool-holder on one of said slides; and a tool-holder on the other of said slides.

2. The combination, with a frame-work supporting a rotary work-holder and a transverse guide-way, of a lateral guide-way at a right angle to the transverse guide-way; a saddle adjustable upon the lateral guide-way; a swivel-plate carried by the saddle; and a tool-slide mounted at the side of the axis of said swivel-plate adjacent to the transverse guideway, whereby the tool-slide may be run up close to the transverse rail and its tool may travel over the entire space intermediate the transverse rail and the work-support.

3. The combination, with frame-work supporting a rotary table and a transverse guide-way, of a lateral guide-way off set from, and in substantially the same plane as, the transverse guide-way; a saddle adjustable upon the lateral guide-way; a swivel-plate, having a lateral extension on the side adjacent the transverse guideway provided with a way, carried by the saddle; and a tool-slide movable on the way and arranged as the saddle is moved close to the transverse rail to project over the face of said transverse rail.

4. The combination, with frame-work supporting a rotary work-holder and a transverse guide-way, of a lateral guide-way; a saddle adjustable on each of said guide-ways; means for actuating the saddles separately or simultaneously along their respective guide-ways; a swivel-plate, having a slide-way, mounted on one of said saddles; a swivel-plate, having a side extension adjacent the other guideway and provided with a slide-way, mounted on the other of said saddles; a tool-slide movable in the slide-way of each of said swivel-plates; and means for actuating said tool-slides separately or simultaneously.

5. The combination, with frame-work supporting a rotary table and a transverse guide-way, of a lateral guide-way offset from and in substantially the same plane as, the transverse guide-way; a saddle on each guide-way; means for actuating the saddles, independently or simultaneously, along their respective guide-ways; a swivel-plate, having a slide-way, carried by one of said saddles; a swivel-plate, having a lateral extension on the side adjacent the other guideway and provided with a slide-way, carried by the other of said saddles; a tool slide mounted in the slide-way of each plate, the tool-slide on the lateral extension being arranged to project over and clear the guide-way which supports the saddle of the other tool-slide; and means for actuating the tool-slides separately or simultaneously.

6. In a machine of the class described the combination with a transverse guide-rail having a rabbeted extension, of a lateral guide-rail rabbeted to fit said extension; and means for detachably securing the lateral guide-rail to the transverse guide-rail.

7. The combination, with frame-work, of a transverse guide rail fitted thereto, and having a rabbeted side; a vertical guide-rail rabbeted to fit said side; means for detachably securing the vertical guide-rail to the transverse guide-rail; saddles adjustably mounted on each guide-rail; tool-slides carried by the saddles; and means for actuating the tool-slides.

8. In a machine of the class described the combination with frame-work having guideways of a transverse guide-rail having a rabbeted extension adjustably mounted upon said guide-ways; a lateral guide-rail, one end of which is rabbeted to fit said extension; bolts for detachably securing the lateral rail to said extension; tool-supporting saddles carried by each rail; and means for actuating said tool-supporting saddles.

9. In a machine of the class described the combination with frame-work having guide-ways, of a transverse guide-rail mounted on the guide-ways; a lateral guide-rail mounted on said guide-ways; a tool-supporting saddle mounted on each guide-rail; means, supported by each rail, for actuating each tool-supporting saddle; and means for detachably uniting the two rails.

10. In a mechanism of the class described, the combination, with frame-work having guide-ways, of a rotatable work-support; means for rotating the work-support; a transverse guide-rail and a lateral guide-rail each adjustably mounted on the guide-ways; a tool-supporting saddle adjustable on each guide-rail; means for adjusting the transverse rail along the guide-ways; and means for rigidly and detachably uniting said rails thereby permitting the optional employment of the transverse rail alone or the two rails united.

11. The combination, with frame-work having guide-ways and supporting a rotary table, of a transverse guide-rail; a tool-head mounted on said rail; a lateral guide-rail also mounted on said frame guide-ways; a tool-head upon said lateral guide-rail; means for rigidly and detachably uniting the two rails; and mechanism engaging the horizontal rail for raising and lowering said rails conjoined.

Signed at Bridgeport in the county of Fairfield and State of Connecticut this 19th day of April A. D., 1904.

EDWARD P. BULLARD, Jr.

Witnesses:
   C. M. NEWMAN,
   W. V. DEVITT.